Patented July 27, 1948

2,445,795

UNITED STATES PATENT OFFICE 2,445,795

HYDROGENATION OF CARBON OXIDES

Alfred J. Millendorf, Beacon, N. Y., assignor, by mesne assignments, to The Texas Company, New York, N. Y., a corporation of Delaware No Drawing. Application December 28, 1944, Serial No. 570,223

3 Claims. (Cl. 260—449.6)

This invention relates to the hydrogenation of carbon oxides, and particularly to the hydrogenation of carbon monoxide to form compounds having two or more carbon atoms per molecule by contact with a hydrogenation catalyst in solid particle form.

The invention has to do with a method of increasing the activity and active life of hydrogenation catalysts employed in the hydrogenation of carbon oxides.

The invention contemplates reacting carbon monoxide and hydrogen by passage in gaseous form in contact with a catalyst such as a cobalt-magnesia-thoria catalyst at a temperature within a predetermined reaction temperature range. During continued use, the activity of the catalyst declines. The activity of the catalyst is restored at least substantially by a method which involves removing waxy material from the catalyst by treatment with hydrogen under activating conditions, reduction of the temperature of the hydrogen-treated catalyst to substantially below the predetermined reaction temperature range, and resuming the passage of carbon monoxide and hydrogen in contact with the catalyst, while slowly raising the temperature of the catalyst to substantially said predetermined reaction temperature range. Thereafter the flow of carbon monoxide and hydrogen is continued under normal reaction conditions of temperature and space velocity for a substantial period of time until the activity of the catalyst has again declined substantially. Thereafter the flow of carbon monoxide and hydrogen is discontinued temporarily to permit restoring the catalyst activity by repeating the aforesaid sequence of steps.

In the hydrogenation of carbon monoxide for the production of normally liquid hydrocarbons high molecular weight waxy materials are formed and accumulate upon the catalyst particles during continued operation. The accumulation of this material is responsible, at least in part, for the decline in catalyst activity. It is customary to effect removal of this waxy material by treatment of the catalyst with suitable solvents or with hydrogen alone or with a combination of solvent and hydrogen treatments. Thus the catalyst may be treated with solvents such as alcohols or high boiling hydrocarbon liquid under conditions adapted to extract the waxy material, or at least the bulk of it, from the catalyst. The extracted catalyst can then be treated with hydrogen at temperatures corresponding substantially to those prevailing during the synthesis reaction and even at higher temperatures. The solvent treatment may be omitted and in which case the catalyst mass is treated with a stream of hydrogen under elevated temperatures advantageously at or above those prevailing during the synthesis reaction so as to effect complete or substantially complete removal of the waxy material.

Heretofore, it has been customary to resume the flow of synthesis gas mixture through the catalyst mass immediately following the aforesaid hydrogen treatment, the catalyst mass remaining at the temperature prevailing during the preceding synthesis reaction.

In accordance with the present invention, the catalyst mass, following or during the hydrogen treatment, is reduced to a temperature substantially below that prevailing during the synthesis reaction. For example, the temperature is reduced to about 200 to 300° F. Thereafter the flow of synthesis gas is resumed under conditions so as to raise the catalyst temperature slowly to substantially the reaction temperature range. Thus the temperature is raised at a rate in the range from about 2 to 30 Fahrenheit degrees per hour. When the catalyst mass has reached the predetermined reaction temperature range, the flow of synthesis gas is continued for a prolonged period of time under the normal conditions of operation.

It has been found that by conditioning the catalyst in this manner, its activity is materially increased over what it is when this conditioning step is omitted.

The invention has particular application to the conditioning of a cobalt-magnesia-thoria catalyst when employed as a stationary mass confined within a reaction zone. After treatment of the catalyst mass with hydrogen under activating conditions, or near the end of such activating treatment, the temperature of the catalyst mass is reduced to a temperature in the range about 200 to 300° F. Thereupon the feed stream of carbon monoxide and hydrogen gas, at substantially said temperature, is passed into the reaction zone and caused to flow therethrough. The temperature of the feed stream is gradually raised so that the temperature of the catalyst mass gradually rises to a temperature of about 360 to 374° F. over a period of time ranging from about 6 to 72 hours. The gas stream may be passd through the catalyst mass at a space velocity ranging from 10 to 1000 cubic feet of synthesis gas measured at standard conditions per cubic foot of catalyst mass per hour. Thereafter the flow of feed stream is continued through the mass while maintaining it at a predetermined reaction temperature in the range about 365 to 395° F. or at a temperature not exceeding about 410° F. The flow under these latter conditions may be continued for a period of about 21 days, more or less depending upon the catalyst, before interruption for regeneration of the catalyst mass. In the conventional type of operation where the conditioning treatment of this invention is omitted, it is the usual practice to employ progressively high reaction temperatures following each regeneration of the used catalyst in order to compensate for the progressive decline in activity of the catalyst. Thus, the fresh catalyst may be employed at a temperature of about 375° F. Then, following regeneration, it is maintained at a temperature of 375 to about 380° F. during the synthesis reaction. Following the next regeneration, it is maintained at a synthesis temperature of about 380° F. or more. When it becomes necessary to employ synthesis temperatures of 400° F and above following repeated regenerations, the catalyst is removed from the system and reworked or else new catalyst is substituted therefor. I have found that by employing the conditioning procedure of my invention, the necessity for employing progressively higher temperature levels during continued use of the catalyst can be avoided. In fact, I have found that the conditioned catalyst may be employed at a somewhat lower temperature level and still obtain a conversion rate equal to, and in some cases greater than, that previously obtaining with the same catalyst.

By way of example, a mixture of one part by volume of carbon monoxide and two parts by volume of hydrogen heated to a temperature of about 370° F. was passed continuously through a contact mass of catalyst having a composition of approximately 32% cobalt, 64% Filter Cel, and 4% thorium and magnesium oxides. The catalyst mass was maintained at a temperature ranging from 374 to 385° F. and was maintained on stream for a prolonged period of time, employing a feed gas space velocity of about 100. The initial yield of hydrocarbons boiling in the range 75° to 750° F. was equal to about 0.76 gal./1000 cubic feet of feed gas which gradually declined to about 0.62 gal./1000 cubic feet as the catalyst remained on stream.

The used catalyst was regenerated by passing a stream of hydrogen gas through the mass while maintained at a temperature of about 385° F. for a period of 24 hours with a space velocity of 100, then reducing the temperature of the mass to 300° F. and then conditioning by passing the feed stream of carbon monoxide and hydrogen through it while gradually increasing the temperature to 374° F. over a period of 12 hours at a space velocity of 100.

The yield of hydrocarbons then obtained upon resuming synthesis reaction conditions amounted to about 1.04 gals./1000 cubic feet, this being the yield rate after the first 36 hours, exclusive of the 12-hour conditioning period.

The conditioned catalyst thus produced a higher yield of hydrocarbons and is also more active, even at a 10° F. lower reaction temperature, than the catalyst regenerated in the conventional manner. Thus the yield obtained when the catalyst is regenerated in the usual fashion with hydrogen and then operated at a temperatures of about 374° F. is about 0.71 gal./1000 cubic feet.

While a cobalt type of catalyst has been mentioned, it is contemplated that iron or nickel or a combination thereof may be used instead of or in conjunction with cobalt; fuller's earth or silica gel in place of Filter Cel and other promoters in place of thorium oxide, as for example the oxides of magnesium, uranium, and vanadium.

It is also contemplated that the synthesis reaction may be employed for the production of oxygenated compounds, rather than hydrocarbons.

Also, the synthesis reaction, as well as the regeneration and conditioning treatments, may be carried out under pressures ranging from atmospheric to several hundred pounds or more.

The proportion of carbon monoxide to hydrogen used in the procedure set forth may vary as desired, depending upon the type of reaction product desired in the synthesis reaction. Usually the composition of the carbon monoxide and hydrogen mixture used during the catalyst conditioning step will correspond substantially to that prevailing during the synthesis reaction.

The reduction in temperature of the catalyst mass prior to the conditioning step may be effected by initially passing carbon monoxide and hydrogen through the mass at relatively low temperature. On the other hand, it may be effected by merely reducing the temperature of the hydrogen stream flowing through the contact mass in the activating step. Thus, when hydrogen alone is used as the agent for removing waxy material from the catalyst mass, such hydrogen treatment may be continued at an elevated temperature in the range 370 to 400° F. or higher for a period of time sufficient to effect complete removal of the waxy material. When the effluent stream from the contact mass is free from hydrocarbons, the temperature of the hydrogen stream may then be reduced to the extent necessary to effect the desired reduction in temperature of the catalyst mass prior to the conditioning step.

This reduction should be to a temperature below that at which the catalyst becomes active. Thus, in some instances it may be sufficient to reduce to a temperature of about 300 or 320° F. or to a temperature in the range 250 to 350° F., depending to some extent upon the particular catalyst employed.

Mention has been made of employing the hydrogenation catalyst in the form of a stationary mass. Such mass may comprise catalysts in the form of pellets, rings, pills, fragments, powder, or other particle forms. In the appended claims the term "particle form" is intended to include the catalyst in whatever solid form used.

Also, the catalyst may be employed in other than fixed or stationary bed types of operations. Thus the catalyst may be used in the form of a fluidized mass. It may be suspended in the gaseous reactants or may be maintained in some other form of motion within or through the reaction zone.

My copending application, Serial No. 650,313, filed February 26, 1946, discloses and claims treatment and conditioning of the catalyst by steps including continuous withdrawal of fluid catalyst from the reaction zone, together with return of the treated catalyst.

Obviously many modifications and variations of the invention as above set forth may be made without departing from the spirit and scope thereof, and therefore only such limitations should be imposed as are indicated in the appended claims.

I claim:

1. The method of improving the activity of a synthesis catalyst containing cobalt which comprises subjecting the catalyst to contact in a reaction zone with a synthesis gas comprising carbon monoxide and hydrogen at a predetermined elevated normal operating temperature in the range about 365 to 410° F. such that substantial conversion of carbon monoxide and hydrogen into hydrocarbons including waxy hydrocarbons occurs, continuing said contact for an extended period of time until there is substantial decline in operating activity of the catalyst, discontinuing contact of the catalyst with said synthesis gas at elevated temperature, removing waxy material from the catalyst by treatment comprising contacting said catalyst with hydrogen at an elevated temperature effective to strip said waxy material from the catalyst, then reducing the temperature of the catalyst to a temperature in the range of about 200 to 300° F., and subsequently passing said synthesis gas in contact with the cooled catalyst while gradually raising the temperature of the cooled catalyst to substantially said predetermined elevated temperature at the rate of about 2 to 30° F. per hour.

2. In the catalytic hydrogenation of carbon monoxide for the production of hydrocarbons, oxygenated hydrocarbons and the like, the method which comprises passing carbon monoxide and hydrogen in contact with a solid particle, synthesis catalyst within a reaction zone, effecting said contact at a temperature within a predetermined range such that a substantial conversion of carbon monoxide into higher molecular weight compounds occurs, with some deposition of solidifiable material upon the catalyst particles, discontinuing the flow of carbon monoxide and hydrogen through said reaction zone, subjecting said catalyst to contact with hydrogen under regenerating conditions including an elevated temperature effective to strip the said solidifiable material from the catalyst, reducing the temperature of the resulting hydrogen treated catalyst to substantially below said predetermined temperature range, thereafter passing a mixture of carbon monoxide and hydrogen in contact with the resulting cooled catalyst while slowly raising the temperature of the catalyst, at the rate of about 2 to 30° F. per hour, to substantially said predetermined range to thereby condition the catalyst and thereafter continuing passage of said carbon monoxide and hydrogen in contact with the catalyst at about said predetermined range.

3. The method according to claim 2, wherein conditioning begins at a temperature below that at which the catalyst becomes active.

ALFRED J. MILLENDORF.

REFERENCES CITED

The following references are of record in the file of this patent:

UNITED STATES PATENTS

| Number | Name | Date |
|---|---|---|
| 1,904,218 | Franceway | Apr. 18, 1933 |
| 2,127,127 | Martin | Aug. 16, 1938 |
| 2,159,140 | Eckell | May 23, 1939 |
| 2,255,126 | Myddleton | Sept. 9, 1941 |
| 2,257,457 | Fischer et al. | Sept. 30, 1941 |
| 2,360,787 | Murphree | Oct. 17, 1944 |

FOREIGN PATENTS

| Number | Country | Date |
|---|---|---|
| 471,595 | Great Britain | Sept. 7, 1937 |

Disclaimer 2,445,795.—*Alfred J. Millendorf*, Beacon, N. Y. HYDROGENATION OF CARBON OXIDES. Patent dated July 27, 1948. Disclaimer filed June 5, 1951, by the assignee, *The Texas Company*.

Hereby enters this disclaimer to claim 2 of said patent without, however, disclaiming the subject matter of claim 3 thereof which is dependent upon said claim 2.

[*Official Gazette August 7, 1951.*]